(12) United States Patent
Kim

(10) Patent No.: US 6,324,127 B1
(45) Date of Patent: *Nov. 27, 2001

(54) MAGNETO-OPTICAL RECORDING LAYER HAVING DOUBLE-LAYER STRUCTURE AND MAGNETO-OPTICAL DISK ADOPTING THE SAME

(75) Inventor: Jae-young Kim, Kunpo (KR)

(73) Assignee: Samsung Electronics Co., Ltd., Suwon (KR)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/785,240

(22) Filed: Jan. 17, 1997

(30) Foreign Application Priority Data

Jan. 18, 1996 (KR) .................................... 96-1031

(51) Int. Cl.$^7$ .................................... G11B 11/00
(52) U.S. Cl. .................................... 369/13; 428/694 ML
(58) Field of Search .................................... 369/13, 288, 283, 369/275.1, 116, 110, 14, 60.01; 360/114; 428/694 ML, 694 DE, 694 RE; 365/122

(56) References Cited

U.S. PATENT DOCUMENTS

| 4,664,977 | * | 5/1987 | Osato et al. | 428/336 |
| 4,814,238 | * | 3/1989 | Tanaka et al. | 428/692 |
| 4,849,304 | * | 7/1989 | Uchiyama et al. | 428/694 |
| 4,999,260 | * | 3/1991 | Saito et al. | 428/694 |
| 5,143,798 | * | 9/1992 | Fujii | 428/694 |
| 5,198,087 | * | 3/1993 | Yung-Kuk et al. | 204/192.3 |
| 5,202,862 | * | 4/1993 | Ohta et al. | 369/13 |
| 5,263,015 | * | 11/1993 | Niihara et al. | 369/116 |
| 5,325,344 | * | 6/1994 | Ohta et al. | 369/13 |

FOREIGN PATENT DOCUMENTS

| 60-79702 | 5/1985 | (JP) . |
| 61-246946 | 11/1986 | (JP) . |
| 62-239447 | 10/1987 | (JP) . |
| 63-148447 | 6/1988 | (JP) . |
| 1-237945 | 9/1989 | (JP) . |
| 4-311008 | 11/1992 | (JP) . |
| 5-28551 | 2/1993 | (JP) . |

OTHER PUBLICATIONS

Magnetic Interface Anisotropy in Pd/Co and Pd/Fe Multilayers, Journal of Magnetism and Magnetic Materials 66 (1987) pp. 351–355, North–Holland, Amsterdam.

Exchange Coupled Magneto–Optic Layers, IEEE Transactions on Magnetics, vol. 24, No. 6, pp. 2557–2559, Nov. 1988.

* cited by examiner

Primary Examiner—Ali Neyzari
(74) Attorney, Agent, or Firm—Staas & Halsey LLP (57) ABSTRACT

A magneto-optical recording layer having a double-layer structure of a first magnetic layer made of an amorphous alloy of a light rare earth-transition metal and a semi-metal, and a second magnetic layer made of an amorphous alloy of a heavy rare earth-transition metal, and a magneto-optical disk adopting the magneto-optical recording layer. In the magneto-optical recording layer, a p–d electron orbit coupling is induced between the transition metal and the semi-metal to reduce the magnetic moment of the amorphous alloy of light rare earth-transition metal without decreasing the magnetic moment of the light rare earth metal, thereby attaining a perpendicular magnetic anisotropy. As a result, a high density magneto-optical recording layer has a double-layer structure including a ferro-magnetic reproducing layer having an excellent magneto-optical characteristic and a ferro-magnetic recording layer having an improved recording stability by an increase of a coercive force, and the double-layer structure is formed on a magneto-optical disk.

47 Claims, 5 Drawing Sheets

MAGNETO-OPTICAL RECORDING LAYER HAVING DOUBLE-LAYER STRUCTURE AND MAGNETO-OPTICAL DISK ADOPTING THE SAME

BACKGROUND OF THE INVENTION

1. Field of the Invention

The present invention relates to a magneto-optical recording layer and a magneto-optical disk adopting the same, and more particularly, to a magneto-optical recording layer with a double-layer structure having a first magnetic layer made of an amorphous alloy of a light rare earth-transition metal and a semi-metal (metalloid), and a second magnetic layer made of an amorphous alloy of a heavy rare earth-transition metal, and a magneto-optical disk adopting the same.

A magneto-optical disk has a higher information memory density as compared with that of a conventional magnetic disk, and a random access characteristic by which desired information is easily searched. Thus, the magneto-optical disk has lately attracted considerable attention as a high density recording medium which can substitute for a hard disk or a magnetic tape.

2. Description of the Related Art

In a conventional method, the recording layer of a magneto-optical disk is manufactured by sputtering or vapor-depositing a binary alloy of a rare earth-transition metal (RE-TM) having a perpendicular magnetic easy axis on the surface thereof.

The coercive force and magneto-optical effect of terbium iron (TbFe) or terbium cobalt (TbCo) as the binary RE-TM alloy are strong enough, but the corrosion resistance thereof is weak.

To overcome the above problems, an alloy of one of the above-mentioned binary alloys and another metal has been used as a material for the magneto-optical recording layer.

There has been developed an amorphous alloy of terbium iron cobalt (TbFeCo) obtained by adding Co to TbFe, which is excellent for information storage stability and is suitably used for long wavelength laser beams (700~1,000 nm). Thus, if an amorphous alloy is used in a short wavelength region (about 400 nm) to increase recording density of information, photoelectric energy is decreased, thereby reducing a Kerr rotation angle. The decreased Kerr rotation angle lowers a carrier-to-noise ratio (CNR) which exhibits reproduction characteristics of the magneto-optical recording medium. Thus, the amorphous alloy of TbFeCo is not suitable as the material for the recording layer of a short wavelength recording medium for the high density recording.

To solve the above problems, an alloy of a light rare earth metal-transition metal (LRE-TM), which increases the Kerr rotation angle in the short wavelength region, has attracted public attention as a material for the recording layer of a short wavelength magneto-optical recording medium. However, since an alloy of NdFeCo is ferro-magnetically coupled, the demagnetizing energy thereof is high. Thus, the alloy of NdFeCo does not have magnetic anisotropy perpendicular to the recording layer plane, so that the alloy cannot be used as the material for the recording layer of short wavelength magneto-optical recording media.

To solve this problem, the light rare earth metal has been partially substituted with a heavy rare earth metal. That is, the ferro-magnetic coupling is partially substituted by a ferri-magnetic coupling to decrease demagnetizing energy, thereby resulting in the development of an alloy which is capable of inducing perpendicular magnetic anisotropy. However, in this case, the Kerr rotation angle is reduced in the short wavelength region as much as the magnetic moment of the light rare earth metal substituted by the heavy rare earth metal.

SUMMARY OF THE INVENTION

To solve the above and other problems, it is an object of the present invention to provide a magneto-optical recording layer having a double-layer structure exhibiting an excellent magneto-optical characteristic, and a magneto-optical disk adopting the magneto-optical recording layer.

According to an aspect of the present invention, there is provided a magneto-optical recording layer having a double-layer structure of a first magnetic layer and a second magnetic layer, wherein the first magnetic layer is made of an amorphous alloy of a light rare earth-transition metal and a semi-metal, and the second magnetic layer is made of an amorphous alloy of a heavy rare earth-transition metal.

According to another aspect of the present invention, there is provided a magneto-optical disk comprising a magneto-optical recording layer having a double-layer structure of a first magnetic layer made of an amorphous alloy of a light rare earth-transition metal and a semi-metal, and a second magnetic layer made of an amorphous alloy of heavy rare earth-transition metal.

BRIEF DESCRIPTION OF THE DRAWINGS

The above and other objects and advantages of the present invention will become more apparent by describing in detail a preferred embodiment thereof with reference to the attached drawings in which.

DETAILED DESCRIPTION OF THE INVENTION

According to the present invention, there are provided a magneto-optical recording layer having a double-layer structure and a magneto-optical disk adopting the magneto-optical recording layer.

In the magneto-optical recording layer of the present invention, the first magnetic layer is under the second magnetic layer, wherein the first magnetic layer is made of an amorphous alloy of a light rare earth-transition metal and a semi-metal, and is used as a reproduction-dedicated layer, and the second magnetic layer is made of an amorphous alloy of heavy rare earth-transition metal and is used as a recording-dedicated layer.

Also, the magneto-optical disk according to an embodiment of the present invention includes, on a substrate, a reflection preventing layer made of a dielectric material, the above magneto-optical recording layer with a double-layer structure including the first magnetic layer and the second magnetic layer, a protection layer for protecting the magneto-optical recording layer, and a reflection layer, in sequence.

Preferably, the light rare earth metal is at least one selected from the group consisting of cerium (Ce), praseodymium (Pr), neodymium (Nd), promethium (Pm), and europium (Eu).

Preferably, the heavy rare earth metal is at least one selected from the group consisting of terbium (Tb), dysprosium (Dy), holomium (Ho), erbium (Er), thulium (Tm) and ytterbium (Yb).

Preferably, the transition metal is at least one selected from the group consisting of iron (Fe), nickel (Ni) and cobalt (Co).

Preferably, the semi-metal is at least one selected from the group consisting of boron (B), silicon (Si) and phosphorous (P).

In the amorphous alloy of a light rare earth-transition metal and a semi-metal as a material for the first magnetic layer of the present invention, the content of the semi-metal is preferably 0.5~5 atomic % with respect to the alloy, particularly, about 2.5~5 atomic % of boron (B), preferably, 3 atomic %, about 1.5~5 atomic % of silicon (Si), preferably, 2 atomic %, and about 0.5~5 atomic % of phosphorous (P), preferably, 1 atomic %, as the semi-metal.

Also, in the heavy rare earth-transition metal alloy used as the material for the second magnetic layer, the content of the heavy rare earth metal with respect to the alloy is preferably 20~30 at.%.

Preferably, as the dielectric material of the reflection preventing layer, silicon nitride (SiN) is mainly used. Also, trisilicon tetranitride ($Si_3N_4$), silicon oxide (SiO) or silicon dioxide ($SiO_2$) may be used.

Preferably, as the material for the protection layer, SiN is mainly used. Also, $Si_3N_4$, SiO or $SiO_2$ may be used.

Also, as the material for the reflection layer, aluminum (Al) alloy or gold (Au) alloy may be used.

Preferably, the first magnetic layer is used as a reproduction-dedicated layer and the second magnetic layer is used as a recording-dedicated layer. Also, the thickness of the first magnetic layer is 10 Å~1 μm and that of the second magnetic layer is 10 Å~1 μm.

The operational principle of a magneto-optical recording layer having the above characteristics will be described.

When an amorphous alloy is fabricated by adding a semi-metal to an amorphous alloy of a light rare earth-transition metal, and free electrons which are emitted from a p orbit of the semi-metal shift to a d orbit of the transition metal which is not fully filled, p-d electron orbit coupling between the semi-metal and the transition metal is induced, which decreases the magnitude of the saturation magnetization. As a result, the demagnetizing energy is decreased to induce a magnetic anisotropy. At this time, the Kerr rotation angle is not affected since the semi-metal does not affect the unfilled 4f orbit which determines the magnetic moment of the light rare earth metal. Thus, the first magnetic layer as a ferro-magnetic layer is supplied with a reproduction-dedicated function. On the other hand, a ferro-magnetic amorphous alloy of a heavy rare earth-transition metal, having a coercive force large enough for stable storage of information, is used as the material for the second magnetic layer. The second magnetic layer forms a magnetic exchange coupling with the reproduction-dedicated first magnetic layer, thereby improving a magneto-optical effect and recording stability, to thus be used exclusively for recording.

Figure 1:
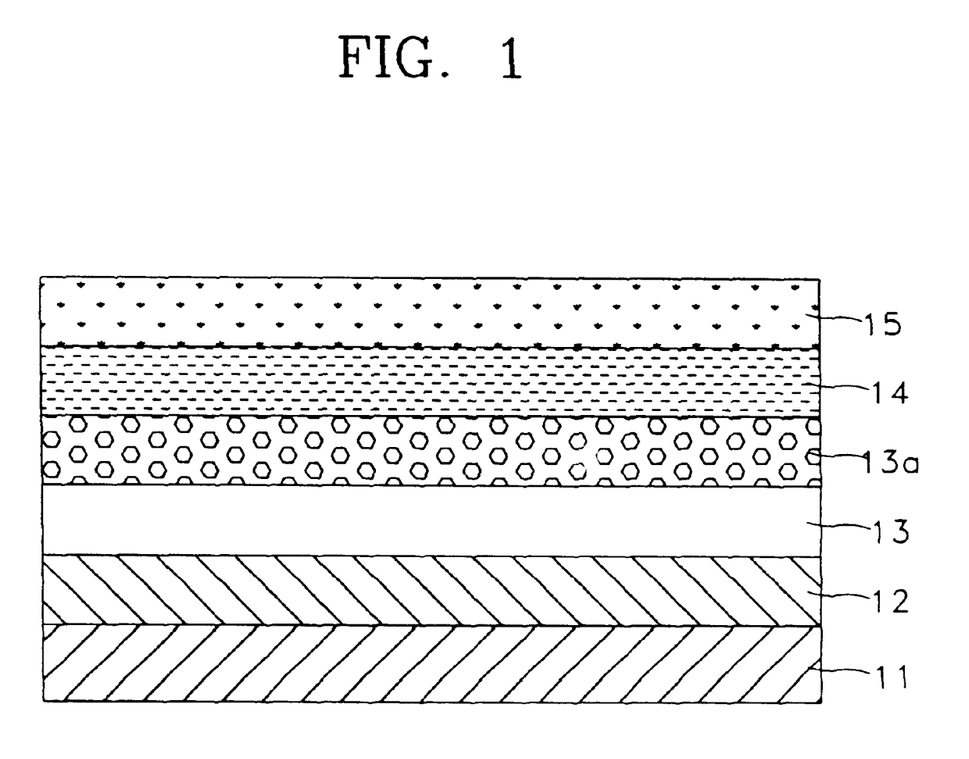
FIG. 1 is a schematic cross-sectional view of a magneto-optical disk according to an embodiment of the present invention.

In FIG. 1, a reflection preventing layer 12 made of a dielectric material such as silicon nitride (SiN) is formed on a transparent substrate 11, and a first magnetic layer 13 and a second magnetic layer 13a which characterize the present invention are formed on the reflection preventing layer 12 in sequence. The first magnetic recording layer 13 is a ferromagnetic layer made of an amorphous alloy of a light rare earth-transition metal and a semi-metal and used exclusively for reproduction. The second magnetic layer 13a is made of an amorphous alloy of a heavy rare earth-transition metal and used exclusively for recording, as a ferro-magnetic layer having a greater coercive force than the ferro-magnetic layer. Also, a protection layer 14 made of a dielectric material such as SiN and a reflection layer 15 made of a material such as an aluminum (Al) alloy are stacked on the second magnetic layer 13a in sequence.

To test the characteristics of the magneto-optical recording layer and the magneto-optical disk adopting the same, after fabricating the above alloys, the magneto-optical recording layer and magneto-optical disk adopting the recording layer were fabricated using the alloys.

For manufacturing the magneto-optical disk, first, an alloy target for forming an amorphous magnetic layer is prepared by adding a semi-metal to an amorphous alloy of light rare earth-transition metal. Then, the obtained alloy is sputtered on the transparent substrate on which an SiN layer as a reflection preventing layer is formed to form a first magnetic layer. Then, a heavy rare earth-transition metal is sputtered on the first magnetic layer to form a second magnetic layer. Here, a physical vapor deposition (PVD) or chemical vapor deposition (CVD) method may be used instead of the sputtering method. Subsequently, SiN is again deposited on the second magnetic layer to form the protection layer, and an aluminum (Al) reflection layer is then stacked on the protection layer.

FIGS. 2 to 5 are graphs showing the characteristics of the magneto-optical recording layer and magneto-optical disk according to the present invention. For testing the characteristics, NdFeCoB alloy and TbFeCo alloy were used in forming the first and second magnetic layers, respectively, unless otherwise specified.

Figure 2:
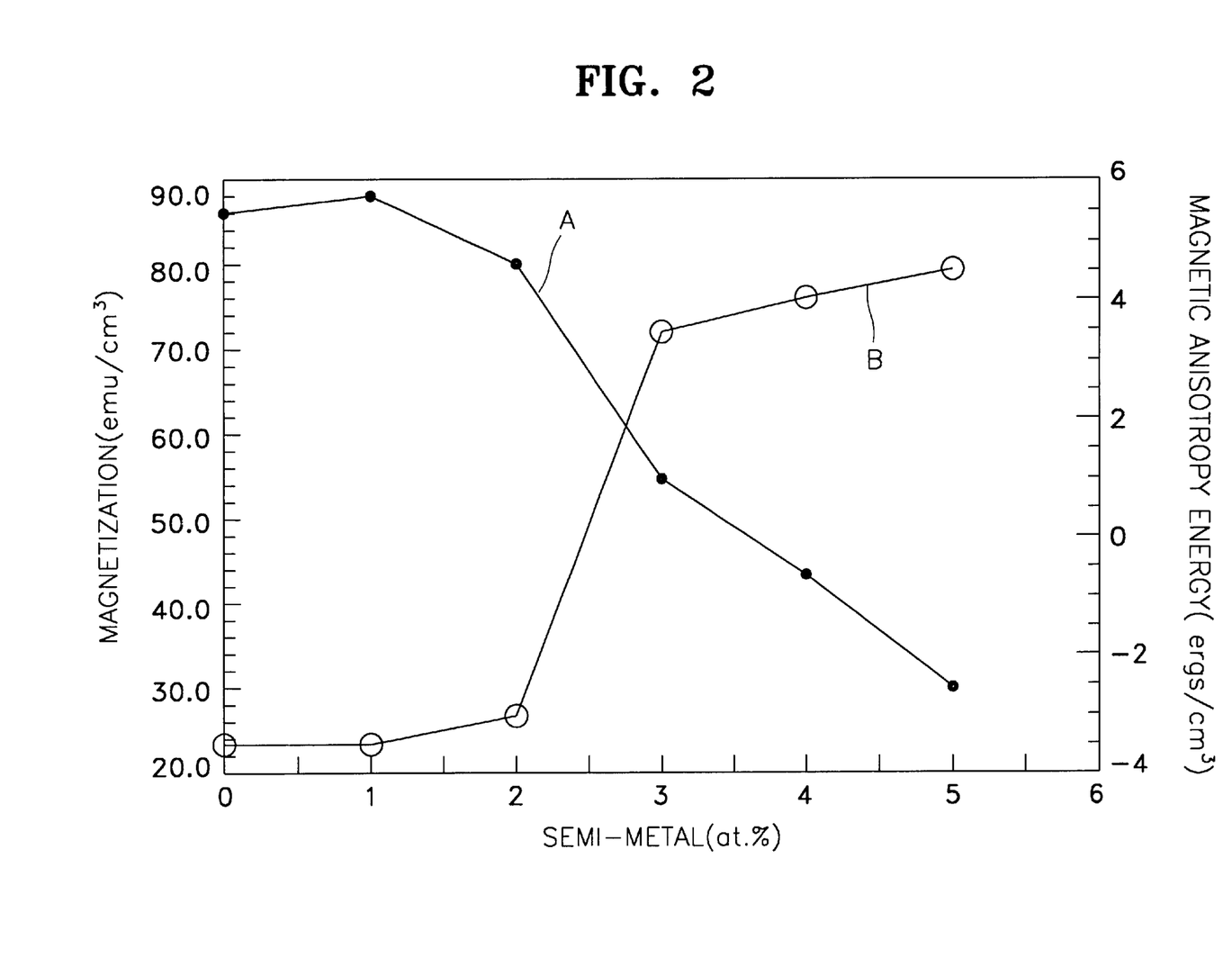
FIG. 2 is a graph showing the changes in saturation magnetization (graph line A) and perpendicular magnetic anisotropy energy (graph line B), depending on the content of a semi-metal added to an amorphous alloy of a light rare earth-transition metal in a short wavelength magneto-optical recording layer of the present invention.

FIG. 2 is a graph showing the saturation magnetization (graph line A) and the perpendicular magnetic anisotropy energy (graph line B) according to the content of the semi-metal added to NdFeCo, in forming the first magnetic layer of the present invention.

As known from FIG. 2, the amorphous alloy of NdFeCo which does not contain a semi-metal cannot have the perpendicular magnetic anisotropic energy due to a large demagnetizing energy caused by the high saturation magnetization. Thus, the amorphous alloy of NdFeCo cannot be employed for forming the first magnetic layer. However, when the content of the semi-metal which undergoes a p-d electron orbit coupling with a transition metal atom is 0.5~5 atomic %, the saturation magnetization of the amorphous alloy is sharply decreased, thereby reducing the demagnetizing energy. As a result, a perpendicular magnetic anisotropy is induced, which allows the amorphous alloy of NdFeCoB containing a semi-metal to be used as a material for a short wavelength magneto-optical layer. This change in the magnetic characteristic is caused by the added semi-metal functioning in an invasive type or substitutional type. That is, in the case where the content of the semi-metal is low at an initial stage of adding semi-metal, the semi-metal acts as an invasive type, the semi-metal invades between the transition metal, thereby applying stress to the transition metal. As a result, the density of state (D.O.S.) of electrons of the transition metal is increased, thereby increasing a magnetic moment. This is demonstrated by the graph of FIG. 2, in which the addition of a small amount of the semi-metal increases the saturation magnetization. In the case where the content of the semi-metal increases to reach an excess state, the semi-metal acts as a substitutional type, the semi-metal atoms occupy all possible invasive positions of the amorphous alloy of NdFeCo, and then surplus semi-metal atoms are substituted for the positions of the transition metal atoms. As a result, the density of state (D.O.S.) of the electrons in a 2p-orbit of this substituted semi-metal is under the tensile stress by an atom size effect of the substituted semi-metal, so that the electrons of below a Fermi level are emitted in a free-electron state to then move to an unfilled 3d-orbit of the transition metal. Thus, the p-d electron orbit coupling occurs between the semi-metal and the transition metal, thereby decreasing the saturation magnetization. The decrease in the saturation magnetization causes a decrease in the demagnetizing energy, thereby inducing the perpendicular magnetic anisotropic energy to the amorphous alloy of NdFeCoB containing the semi-metal. Here, since the semi-metal, boron, in the amorphous alloy of NdFeCoB does not affect a 4f-electron orbit of a light rare earth metal, Nd atoms, the Kerr rotation angle in the short wavelength region is not affected thereby, either. Thus, it is suitable for the amorphous alloy of NdFeCoB to be used as a magneto-optical layer for a short wavelength.

As above, free electrons emitted from the semi-metal added to the alloy of the light rare earth-transition metal can couple with only the 3d orbit of the transition metal, not with the 4f orbit determining a magnetic moment, thereby providing an excellent optical magnetic effect at the short wavelength region.

Figure 3:
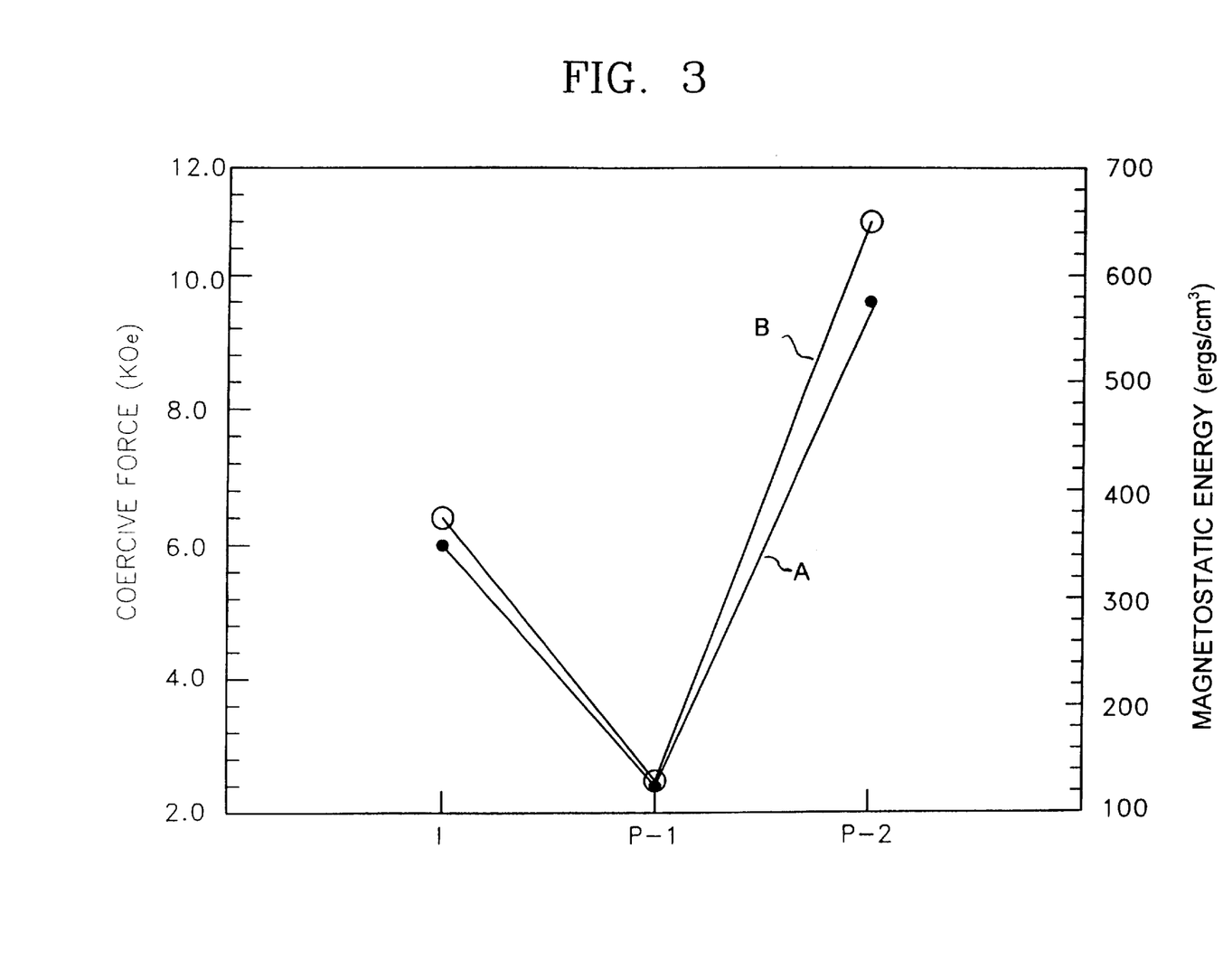
FIG. 3 is a graph comparatively showing the changes in coercive force and magnetostatic energy of the short wavelength magneto-optical recording layer of the present invention and a conventional magneto-optical recording layer.

FIG. 3 is a graph for comparatively showing the changes in the coercive force (graph line A) and magnetostatic energy (graph line B) of the magneto-optical recording layer according to the present invention and a conventional art. Also, reference character I represents the magneto-optical recording layer according to the present invention, including first and second magnetic layers 13 and 13a, reference character P-1 represents a conventional magneto-optical recording layer made of an amorphous alloy of light rare earth-transition metal, and reference character P-2 represents a conventional magneto-optical recording layer made of an amorphous alloy of heavy rare earth-transition metal. In the case of the conventional magneto-optical recording layer P-1, the magnetic moments of the light rare earth metal and transition metal in the amorphous alloy are arranged with a ferro-magnetic property in an equilibrium state, so that Lorentz force between the magnetic moments does not suppress magnetization, thereby exhibiting a low coercive force. However, in the case of the conventional magneto-optical recording layer P-2, the magnetic moments of the heavy rare earth metal and transition metal in the amorphous alloy are arranged with a ferri-magnetic property in a semi-equilibrium state, so that the Lorentz force between each magnetic moment suppresses magnetization (pinning effect), thereby exhibiting a high coercive force. Also, in the case of the magneto-optical recording layer according to the present invention I, the coercive force thereof is close to the average of the coercive forces of the P-1 and P-2 by a magnetic exchange coupling between the ferro-magnetic layer having a low coercive force and the ferri-magnetic layer having a large coercive force.

On the other hand, magnetostatic energy represents the amount of energy emitted from a magnetic substance to the outside and corresponds to the inner area of a magnetic history curve. Thus, the magnetostatic energy is proportional to a value obtained by multiplying the remaining magnetization by the coercive force. Referring to FIG. 3, in the case of the conventional magneto-optical recording layer P-1, the change in the magnetostatic energy is small because of the decreased saturation magnetization due to the addition of the semi-metal and the decreased coercive force due to the ferro-magnetism. However, in the case of the conventional magneto-optical recording layer P-2, the magnetostatic energy is high because of the increased coercive force due to the Lorentz force having the ferri-magnetism. In the case of the short wavelength magneto-optical recording layer I according to the present invention, the magnetostatic energy is close to the average of the magnetostatic energies of P-1 and P-2. Accordingly, it is understood that the magneto-optical recording layer having a double-layer structure of a reproduction-dedicated ferro-magnetic layer formed of an amorphous alloy of a light rare earth-transition metal and a semi-metal, and a recording-dedicated ferri-magnetic layer made of an amorphous alloy of a heavy rare earth-transition metal is suitably used as a short wavelength magneto-optical recording layer.

Figure 4:
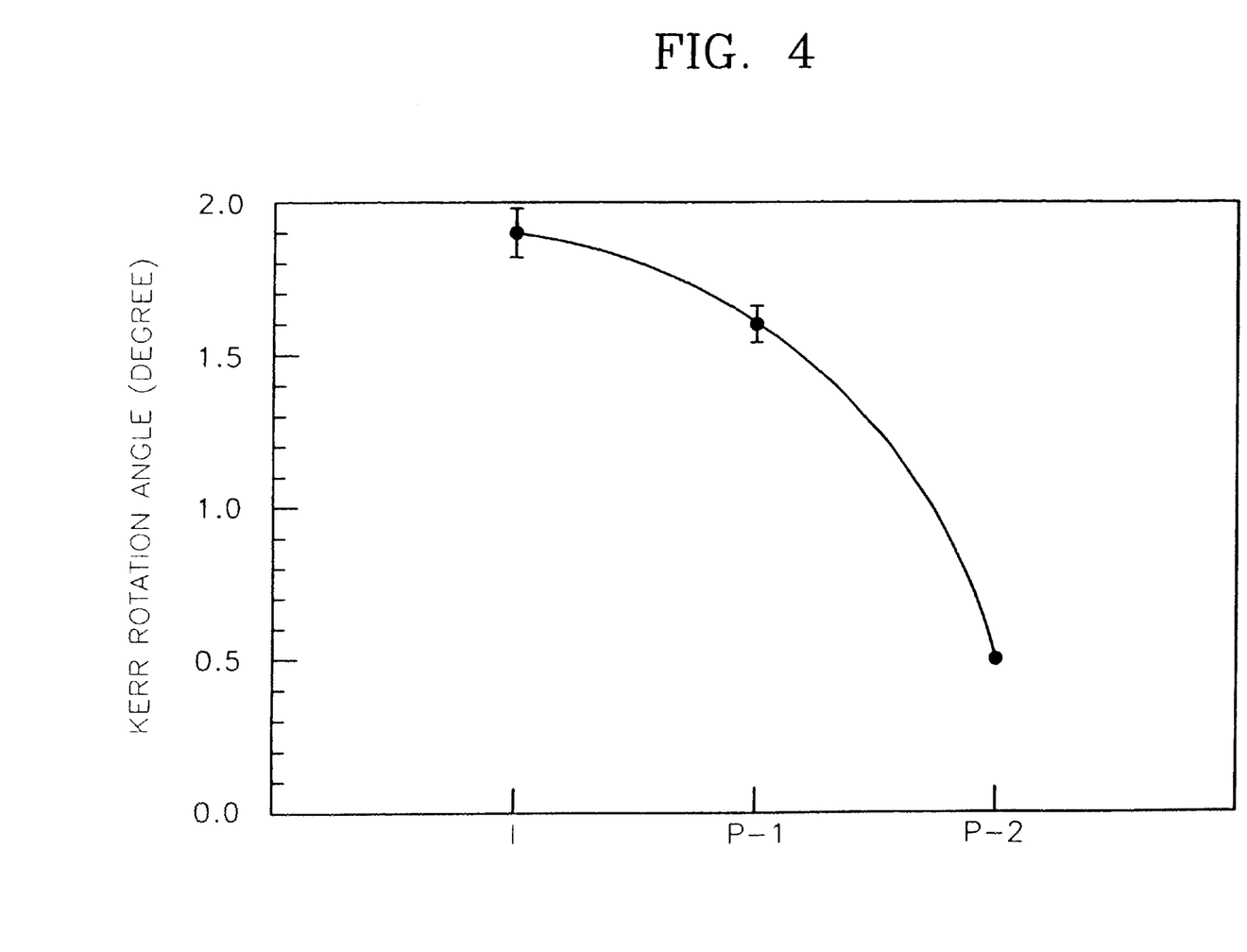
FIG. 4 is a graph comparatively showing a change in a Kerr rotation angle in a short wavelength region (400 nm) of a magneto-optical disk of the present invention and that of a conventional magneto-optical disk.

FIG. 4 is a graph for comparatively showing the change in the Kerr rotation angle, in a short wavelength region (400 nm), of the magneto-optical disk of the present invention and the conventional magneto-optical disk.

As shown in FIG. 4, the change in the Kerr rotation angle is larger in the amorphous alloy of the light rare earth-transition metal and the semi-metal than that in the amorphous alloy of the heavy rare earth-transition metal. In addition, in the case of the magneto-optical recording layer having the double-layer structure according to the present invention, the change in the Kerr rotation angle is much larger.

Figure 5:
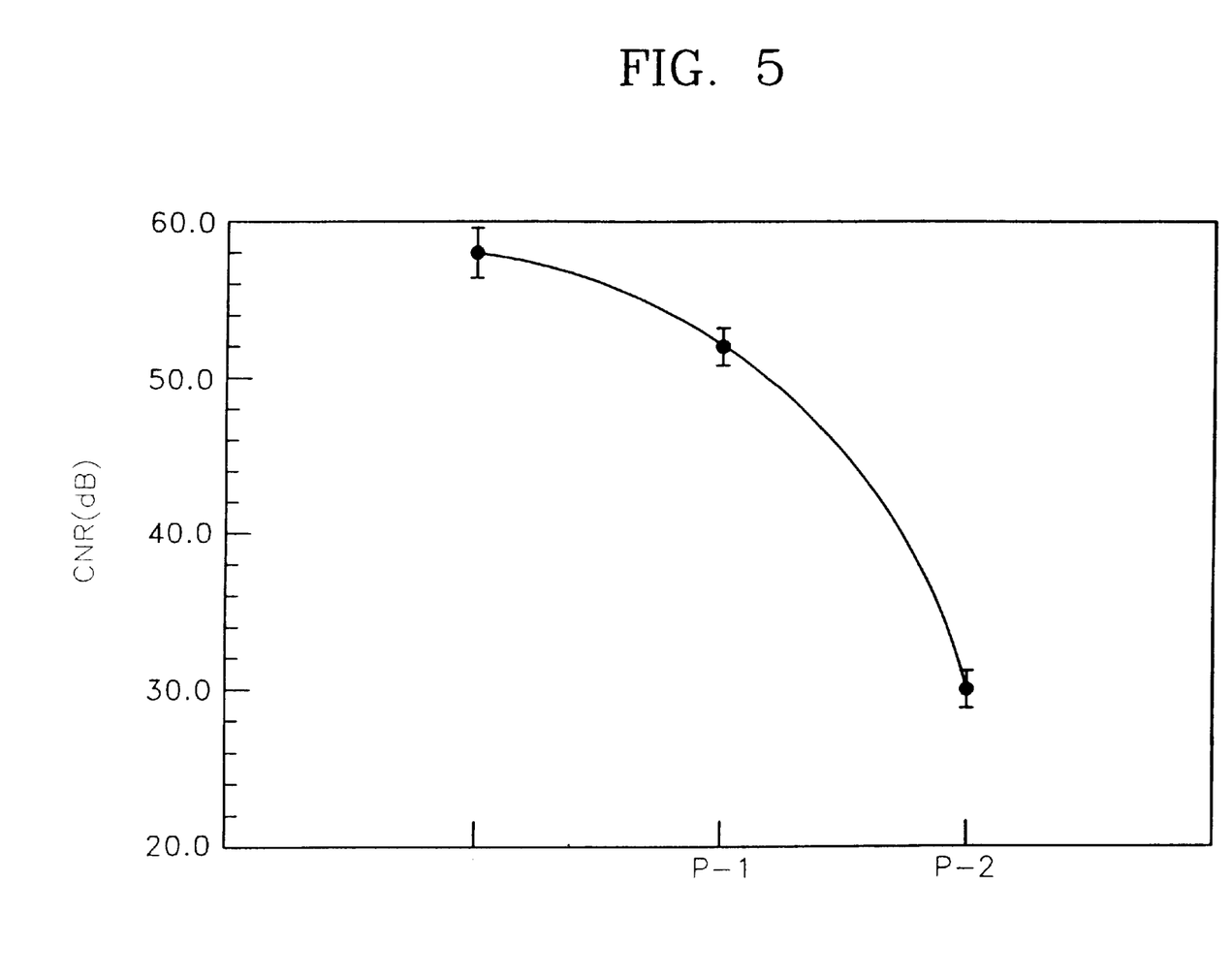
FIG. 5 is a graph comparatively showing a carrier-to-noise ratio (CNR) as a reproduction characteristic at the short wavelength region (400 nm) of the magneto-optical disk of the present invention and that of the conventional magneto-optical disk.

FIG. 5 is a graph for comparatively showing a carrier-to-noise ratio (CNR) as a reproduction characteristic of the magneto-optical disk according to the present invention and that of the conventional magneto-optical disk at a short wavelength region (400 nm).

As shown in FIG. 5, the magneto-optical disk adopting the magneto-optical recording layer I having the double-layer structure according to the present invention has a higher CNR than those of the magneto-optical disks adopting the conventional magneto-optical recording layers P-1 and P-2, i.e., above 50 dB, which allows the magneto-optical recording layer to be used as an excellent high density recording layer.

When the experiment of the above embodiment is repeated using Si and P instead of B as the semi-metal, an excellent result was also obtained. That is, the result is preferable at about 1.5~5 at.% of Si, particularly, about 2 at.%, and about 0.5~5 at.% of P, particularly, about 1 at.%.

As described above, according to the magneto-optical recording layer of the present invention, a p-d electron orbit coupling is induced between the transition metal and the semimetal to reduce the magnetic moment of an amorphous alloy of light rare earth-transition metal without reducing that of a light rare earth metal, thereby attaining a perpendicular magnetic anisotropy. As a result, in the case of using a laser beam of a short wavelength region, a high density magneto-optical recording layer of a double-layer structure including a ferro-magnetic reproducing layer having an excellent magneto-optical characteristic and a ferri-magnetic recording layer having an improved recording stability by an increase of a coercive force, and a magneto-optical disk adopting the same can be provided.

While the present invention has been illustrated with reference to a specific embodiment, this invention is not limited thereto and further modifications and alterations may be effected by those skilled in the art within the spirit and scope of this invention.

What is claimed is:

1. A magneto-optical recording layer comprising:
   a double-layer structure, including
      a first magnetic layer made of an amorphous alloy of a light rare earth-transition metal and a semi-metal, and
      a second magnetic layer made of an amorphous alloy of a heavy rare earth-transition metal;
   wherein a transition metal magnetic moment of the first magnetic layer is reduced by an addition of the semi-metal, without reducing a magnetic moment of the light rare earth metal.

2. A magneto-optical recording layer as claimed in claim 1, wherein said light rare earth metal is at least one selected from a group consisting of cerium (Ce), praseodymium (Pr), neodymium (Nd), promethium (Pm), and europium (Eu).

3. A magneto-optical recording layer as claimed in claim 1, wherein said heavy rare earth metal is at least one selected from a group consisting of terbium (Tb), dysprosium (Dy), holomium (Ho), erbium (Er), thulium (Tm) and ytterbium (Yb).

4. A magneto-optical recording layer as claimed in claim 1, wherein said transition metal is at least one selected from a group consisting of iron (Fe), nickel (Ni) and cobalt (Co).

5. A magneto-optical recording layer as claimed in claim 1, wherein said semi-metal is at least one selected from a group consisting of boron (B), silicon (Si) and phosphorous (P), and a content of said semi-metal is 0.5~5 atomic % with respect to said amorphous alloy of light rare earth-transition metal and semi-metal.

6. A magneto-optical recording layer as claimed in claim 5, wherein said semi-metal is B and a content of said semi-metal of B is 2.5~5 atomic % with respect to said amorphous alloy of light rare earth-transition metal and semi-metal.

7. A magneto-optical recording layer as claimed in claim 5, wherein said semi-metal is Si and a content of said semi-metal of Si is 1.5~5 atomic % with respect to said amorphous alloy of light rare earth-transition metal and semi-metal.

8. A magneto-optical recording layer as claimed in claim 5, wherein said semi-metal is P and a content of said semi-metal of P is 0.5~5 atomic % with respect to said amorphous alloy of light rare earth-transition metal and semi-metal.

9. A magneto-optical recording layer as claimed in claim 1, wherein said first magnetic layer is a reproduction-dedicated layer and said second magnetic layer is a recording-dedicated layer.

10. A magneto-optical disk comprising:
    a magneto-optical recording layer having a double-layer structure, said double-layer structure including
       a first magnetic layer made of an amorphous alloy of a light rare earth-transition metal and a semi-metal, and
       a second magnetic layer made of an amorphous alloy of a heavy rare earth-transition metal;
    wherein a transition metal magnetic moment of the first magnetic layer is reduced by an addition of the semi-metal, without reducing a magnetic moment of the light rare earth metal.

11. A magneto-optical disk as claimed in claim 10, wherein said light rare earth metal is at least one selected from a group consisting of cerium (Ce), praseodymium (Pr), neodymium (Nd), promethium (Pm), and europium (Eu).

12. A magneto-optical disk as claimed in claim 10, wherein said heavy rare earth metal is at least one selected from a group consisting of terbium (Tb), dysprosium (Dy), holomium (Ho), erbium (Er), thulium (Tm) and ytterbium (Yb).

13. A magneto-optical disk as claimed in claim 10, wherein said transition metal is at least one selected from a group consisting of iron (Fe), nickel (Ni) and cobalt (Co).

14. A magneto-optical disk as claimed in claim 10, wherein said semi-metal is at least one selected from a group consisting of boron (B), silicon (Si) and phosphorous (P), and a content of said semi-metal is 0.5~5 atomic % with respect to said amorphous alloy of light rare earth-transition metal.

15. A magneto-optical disk as claimed in claim 14, wherein said semi-metal is B and the content of said semi-metal of B is 2.5~5 atomic % with respect to said amorphous alloy of light rare earth-transition metal.

16. A magneto-optical recording layer as claimed in claim 14, wherein said semi-metal is Si and the content of said semi-metal of B is 1.5~5 atomic % with respect to said amorphous alloy of light rare earth-transition metal.

17. A magneto-optical recording layer as claimed in claim 14, wherein said semi-metal is P and the content of said semi-metal of P is 0.5~5 atomic % with respect to said amorphous alloy of light rare earth-transition metal.

18. A magneto-optical recording layer as claimed in claim 10, wherein said first magnetic layer is a repro duction-dedicated layer and said second magnetic layer is a recording-dedicated layer.

19. A magneto-optical disk comprising:
    a substrate;
    a reflection preventing layer made of a dielectric material and formed on said substrate;
    a magneto-optical recording layer having a double-layer structure of a first magnetic layer made of an amorphous alloy of a light rare earth-transition metal and a semi-metal, formed on said reflection preventing layer, and a second magnetic layer made of an amorphous alloy of a heavy rare earth-transition metal and formed on said first magnetic layer;
    a protection layer for protecting said magneto-optical recording layer, said protection layer being formed on said second magnetic layer; and
    a reflection layer formed on said protection layer;
    wherein a transition metal magnetic moment of the first magnetic layer is reduced by an addition of the semi-metal, without reducing a magnetic moment of the light rare earth metal.

20. A magneto-optical disk as claimed in claim 19, wherein said light rare earth metal is at least one selected from a group consisting of cerium (Ce), praseodymium (Pr), neodymium (Nd), promethium (Pm), and europium (Eu).

21. A magneto-optical disk as claimed in claim 19, wherein said heavy rare earth metal is at least one selected from a group consisting of terbium (Tb), dysprosium (Dy), holomium (Ho), erbium (Er), thulium (Tm) and ytterbium (Yb).

22. A magneto-optical disk as claimed in claim 19, wherein said transition metal is at least one selected from a group consisting of iron (Fe), nickel (Ni) and cobalt (Co).

23. A magneto-optical disk as claimed in claim 19, wherein said semi-metal is at least one selected from a group consisting of boron (B), silicon (Si) and phosphorous (P), and the content of said semi-metal is 0.5~5 atomic % with respect to said amorphous alloy of light rare earth-transition metal.

24. A magneto-optical disk as claimed in claim 23, wherein said semi-metal is B and a content of said semi-metal of B is 2.5~5 atomic % with respect to said amorphous alloy of light rare earth-transition metal.

25. A magneto-optical recording layer as claimed in claim 23, wherein said semi-metal is Si and a content of said semi-metal of Si is 1.5~5 atomic % with respect to said amorphous alloy of light rare earth-transition metal.

26. A magneto-optical recording layer as claimed in claim 23, wherein said semi-metal is P and a content of said semi-metal of P is 1.5~5 atomic % with respect to said amorphous alloy of light rare earth-transition metal.

27. A magneto-optical disk as claimed in claim 19, wherein said dielectric material is at least one selected from a group consisting of silicon nitride (SiN), trisilicon tetranitride ($Si_3N_4$), silicon oxide (SiO) and silicon dioxide ($SiO_2$).

28. A magneto-optical disk as claimed in claim 19, wherein said protection layer is made of one dielectric material selected from a group consisting of silicon nitride (SiN), trisilicon tetranitride ($Si_3N_4$), silicon oxide (SiO) and silicon dioxide ($SiO_2$).

29. A magneto-optical disk as claimed in claim 19, wherein said reflection layer is made of one metal alloy selected from a group consisting of an aluminum (Al) alloy and a gold (Au) alloy.

30. A magneto-optical disk as claimed in claim 19, wherein said first magnetic layer is a reproduction-dedicated layer and said second magnetic layer is a recording-dedicated layer.

31. A magneto-optical disk as claimed in claim 19, wherein a thickness of said first magnetic layer is 10 Å~1 μm and a thickness of said second magnetic layer is 10 Å~1 μm.

32. A magneto-optical recording layer as claimed in claim 1, wherein:
said light rare earth metal is at least one selected from a group consisting of cerium (Ce), praseodymium (Pr), neodymium (Nd), promethium (Pm), and europium (Eu);
said heavy rare earth metal is at least one selected from a group consisting of terbium (Tb), dysprosium (Dy), holomium (Ho), erbium (Er), thulium (Tm) and ytterbium (Yb);
said transition metal is at least one selected from a group consisting of iron (Fe), nickel (Ni) and cobalt (Co); and
said semi-metal is at least one selected from a group consisting of boron (B), silicon (Si) and phosphorous (P), and the content of said semi-metal is 0.5~5 atomic % with respect to said amorphous alloy of light rare earth-transition metal and semi-metal.

33. A magneto-optical disk as claimed in claim 32, wherein the content of said semi-metal is approximately 3 atomic %, 2 atomic %, and 1 atomic % with respect to said amorphous alloy of light rare earth-transition metal and semi-metal if said semi metal is B, Si, and P, respectively.

34. A magneto-optical disk as claimed in claim 10, wherein:
said light rare earth metal is at least one selected from a group consisting of cerium (Ce), praseodymium (Pr), neodymium (Nd), promethium (Pm), and europium (Eu);
said heavy rare earth metal is at least one selected from a group consisting of terbium (Tb), dysprosium (Dy), holomium (Ho), erbium (Er), thulium (Tm) and ytterbium (Yb);
said transition metal is at least one selected from a group consisting of iron (Fe), nickel (Ni) and cobalt (Co); and
said semi-metal is at least one selected from a group consisting of boron (B), silicon (Si) and phosphorous (P), and the content of said semi-metal is 0.5~5 atomic % with respect to said amorphous alloy of heavy rare earth-transition metal.

35. A magneto-optical disk as claimed in claim 34, wherein the content of said semi-metal is approximately 3 atomic %, 2 atomic %, and 1 atomic % with respect to said amorphous alloy of light rare earth-transition metal and semi-metal if said semi metal is B, Si, and P, respectively.

36. A magneto-optical disk as claimed in claim 10, wherein a p-d electron orbit coupling is induced between said transition metal of said first magnetic layer and said semi-metal to reduce a magnetic moment of said amorphous alloy of light rare earth-transition metal without decreasing a magnetic moment of said light rare earth metal.

37. A magneto-optical disk as claimed in claim 19, wherein:
said light rare earth metal is at least one selected from a group consisting of cerium (Ce), praseodymium (Pr), neodymium (Nd), promethium (Pm), europium (Eu) and gadolinium (Gd);
said heavy rare earth metal is at least one selected from a group consisting of terbium (Tb), dysprosium (Dy), holomium (Ho), erbium (Er), thulium (Tm) and ytterbium (Yb);
said transition metal is at least one selected from a group consisting of iron (Fe), nickel (Ni) and cobalt (Co);
said semi-metal is at least one selected from a group consisting of boron (B), silicon (Si) and phosphorous (P), and the content of said semi-metal is 0.5~5 atomic % with respect to said amorphous alloy of heavy rare earth-transition metal;
said dielectric material is at least one selected from a group consisting of silicon nitride (SiN), trisilicon tetranitride ($Si_3N_4$), silicon oxide (SiO) and silicon dioxide ($SiO_2$);
said protection layer is made of one dielectric material selected from a group consisting of SiN, $Si_3N_4$, SiO and $SiO_2$; and
said reflection layer is made of one metal alloy selected from the group consisting of an aluminum (Al) alloy and a gold (Au) alloy.

38. A magneto-optical disk as claimed in claim 37, wherein the content of said semi-metal is approximately 3 atomic %, 2 atomic %, and 1 atomic % with respect to said amorphous alloy of light rare earth-transition metal and semi-metal if said semi metal is B, Si, and P, respectively.

39. A method of manufacturing a magneto-optical recording medium, comprising the steps of:
adding a semi-metal to an amorphous alloy of a light rare earth-transition metal, to produce an alloy metal;

forming a first magnetic layer of the alloy metal on a support layer; and forming a second magnetic layer made of a heavy rare earth metal-transition metal on the first magnetic layer;

wherein a transition metal magnetic moment of the first magnetic layer is reduced by an addition of the semi-metal, without reducing a magnetic moment of the light rare earth metal.

40. A method as claimed in claim 39, further comprising the step of forming a layer made of a dielectric material on a transparent substrate to produce the support layer, prior to said step of forming the first magnetic layer.

41. A method as claimed in claim 39, wherein the first magnetic layer is sputtered on the support layer and the second magnetic layer is sputtered on the first magnetic layer.

42. A method as claimed in claim 39, wherein the first magnetic layer is formed on the support layer and the second magnetic layer is formed on the first magnetic layer by physical vapor deposition (PVD).

43. A method as claimed in claim 39, wherein the first magnetic layer is formed on the support layer and the second magnetic layer is formed on the first magnetic layer by chemical vapor deposition (CVD).

44. A method as claimed in claim 39, further comprising the steps of:

forming an SiN layer on the second magnetic layer; and forming an aluminum reflection layer on the SiN layer.

45. A method as claimed in claim 40, further comprising the steps of:

forming an SiN layer on the second magnetic layer; and forming an aluminum reflection layer on the SiN layer.

46. A magneto-optical recording layer comprising:

a double-layer structure, including a first magnetic layer consisting of an amorphous alloy of a light rare earth-transition metal and a semi-metal, and a second magnetic layer consisting of an amorphous alloy of a heavy rare earth-transition metal;

wherein a transition metal magnetic moment of the first magnetic layer is reduced by an addition of the semi-metal, without reducing a magnetic moment of the light rare earth metal.

47. A magneto-optical recording layer comprising:

a double-layer structure, including a first magnetic layer made of an amorphous alloy of a light rare earth-transition metal and a semi-metal, in which the semi-metal is of such a quantity so that atoms thereof occupy all invasive positions of the amorphous alloy, and some of the semi-metal atoms substitute for positions of atoms of the transition metal, thereby decreasing a saturation magnetization of the first magnetization layer, and a second magnetic layer made of an amorphous alloy of a heavy rare earth-transition metal;

wherein the first magnetic layer is devoid of any heavy rare earth metal and the second magnetic layer is devoid of any light rare earth metal;

wherein a transition metal magnetic moment of the first magnetic layer is reduced by an addition of the semi-metal, without reducing a magnetic moment of the light rare earth metal.

* * * * *